US009077957B2

(12) United States Patent
Kano

(10) Patent No.: US 9,077,957 B2
(45) Date of Patent: Jul. 7, 2015

(54) VIDEO REPRODUCING APPARATUS, DISPLAY CONTROL METHOD THEREFOR, AND STORAGE MEDIUM STORING DISPLAY CONTROL PROGRAM THEREFOR

(71) Applicant: CANON KABUSHIKI KAISHA, Tokyo (JP)

(72) Inventor: Takahiko Kano, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/043,896

(22) Filed: Oct. 2, 2013

(65) Prior Publication Data

US 2014/0099074 A1   Apr. 10, 2014

(30) Foreign Application Priority Data

Oct. 4, 2012   (JP) .................. 2012-222203

(51) Int. Cl.
| | | |
|---|---|---|
| H04N 5/775 | (2006.01) | |
| H04N 5/915 | (2006.01) | |
| H04N 5/445 | (2011.01) | |
| H04N 21/4402 | (2011.01) | |
| H04N 21/431 | (2011.01) | |
| H04N 21/485 | (2011.01) | |
| H04N 5/77 | (2006.01) | |
| H04N 9/79 | (2006.01) | |
| H04N 21/432 | (2011.01) | |
| H04N 21/472 | (2011.01) | |
| H04N 21/845 | (2011.01) | |

(52) U.S. Cl.
CPC .......... *H04N 5/915* (2013.01); *H04N 5/44543* (2013.01); *H04N 21/440263* (2013.01); *H04N 21/4312* (2013.01); *H04N 21/4858* (2013.01); *H04N 5/772* (2013.01); *H04N 9/7921* (2013.01); *H04N 21/4325* (2013.01); *H04N 21/47217* (2013.01); *H04N 21/8456* (2013.01)

(58) Field of Classification Search
USPC .................................. 386/230, 232, 224, 248
See application file for complete search history.

(56) References Cited

U.S. PATENT DOCUMENTS

| | | | | |
|---|---|---|---|---|
| 5,974,235 A | * | 10/1999 | Nunally et al. | 709/202 |
| 7,545,410 B2 | * | 6/2009 | Oka et al. | 348/211.2 |
| 2004/0125124 A1 | * | 7/2004 | Kim et al. | 345/716 |
| 2010/0013757 A1 | * | 1/2010 | Ogikubo | 345/156 |
| 2011/0102561 A1 | * | 5/2011 | Ichihashi | 348/56 |
| 2011/0249952 A1 | * | 10/2011 | Taniguchi | 386/230 |
| 2012/0207452 A1 | * | 8/2012 | Wang et al. | 386/280 |

FOREIGN PATENT DOCUMENTS

JP   2007-166501 A   6/2007

* cited by examiner

*Primary Examiner* — Helen Shibru
(74) *Attorney, Agent, or Firm* — Rossi, Kimms & McDowell LLP

(57) ABSTRACT

A video reproducing apparatus that allows a user to visually identify a video component taken at a frame rate that is different from the normal frame rate on a time sequence bar. A reproduction unit reproduces a video image in which video components taken at different frame rates are mixed and to display the video image on a display unit. A display control unit displays a sequence bar on the display unit. The display control unit controls so that a ratio of the length of a section indicating a second video component to its taking time is larger than a ratio of the length of a section indicating a first video component to its taking time, when the video image includes the first and second video components taken at first and second (higher) frame rates, respectively, and when the sections are indicated on the sequence bar.

22 Claims, 10 Drawing Sheets

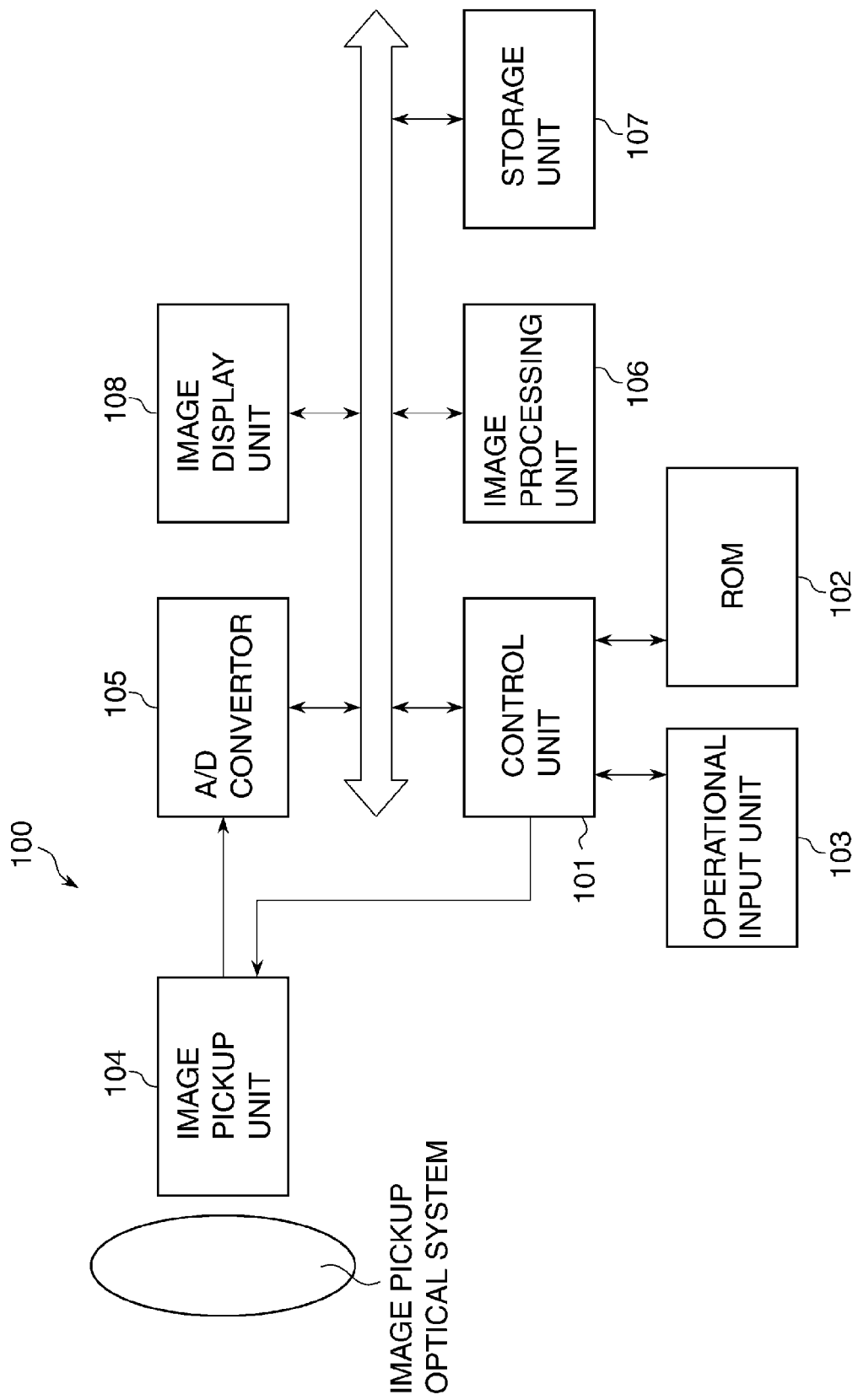

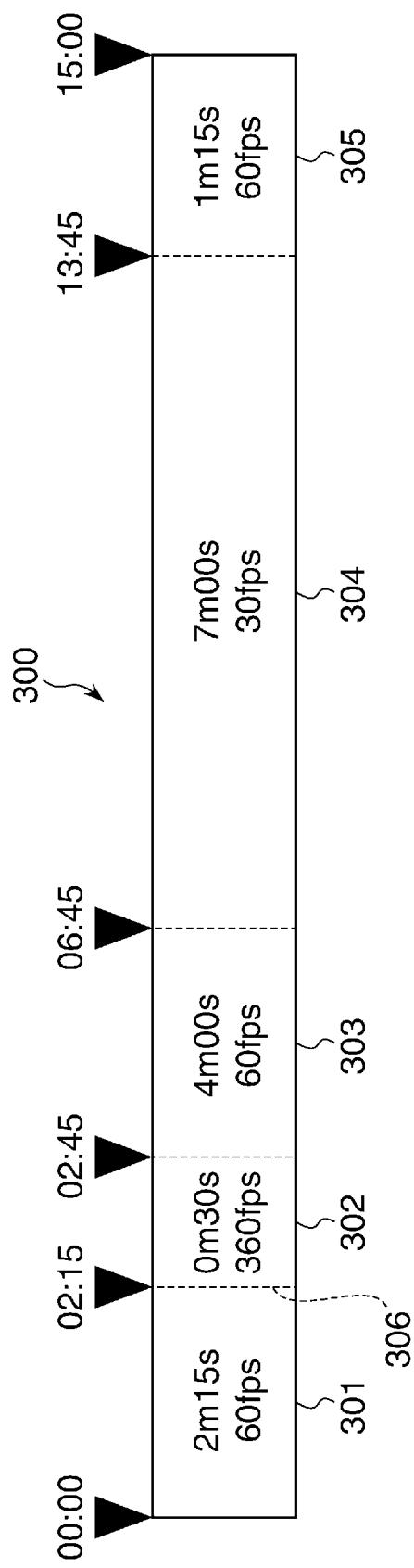

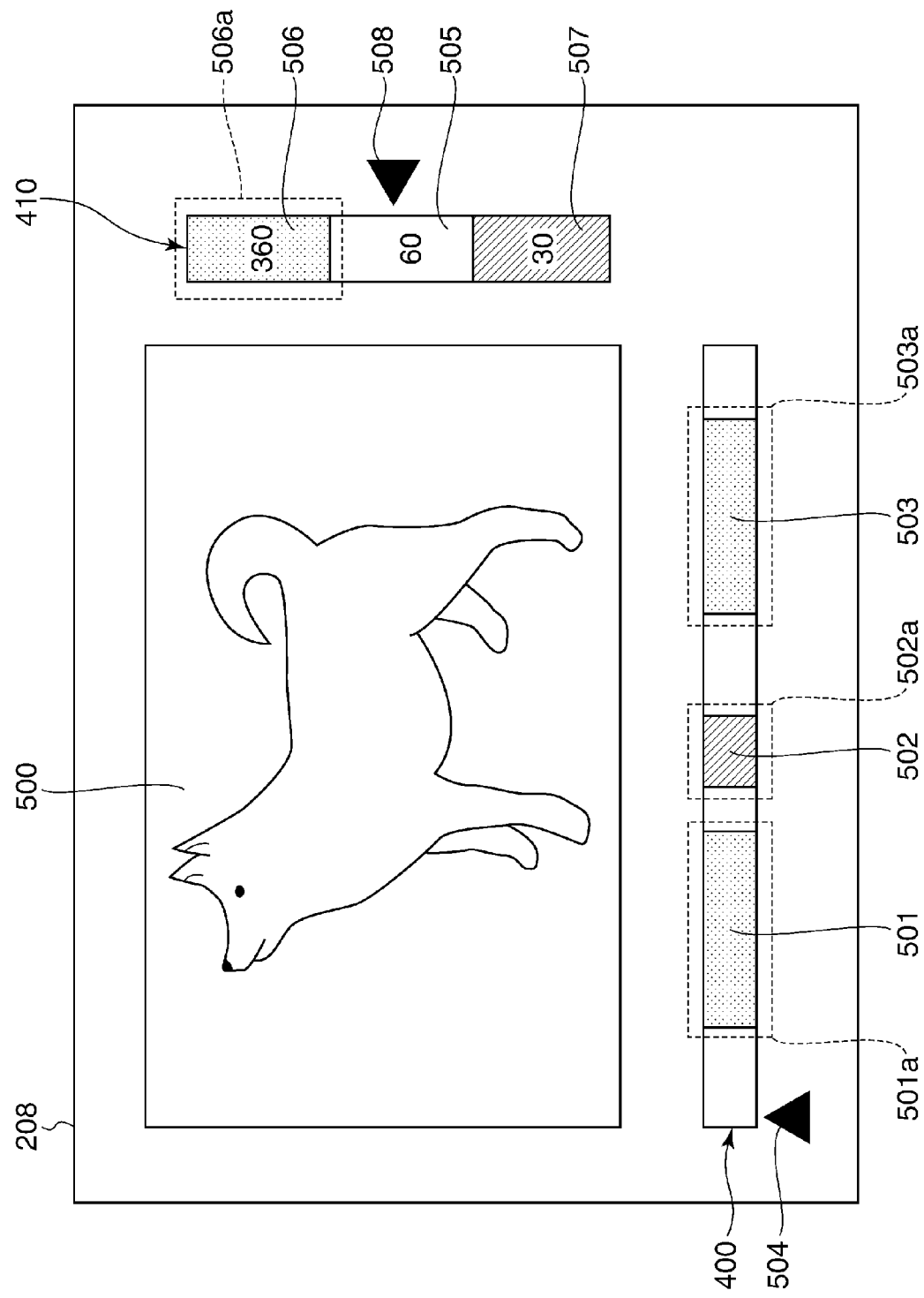

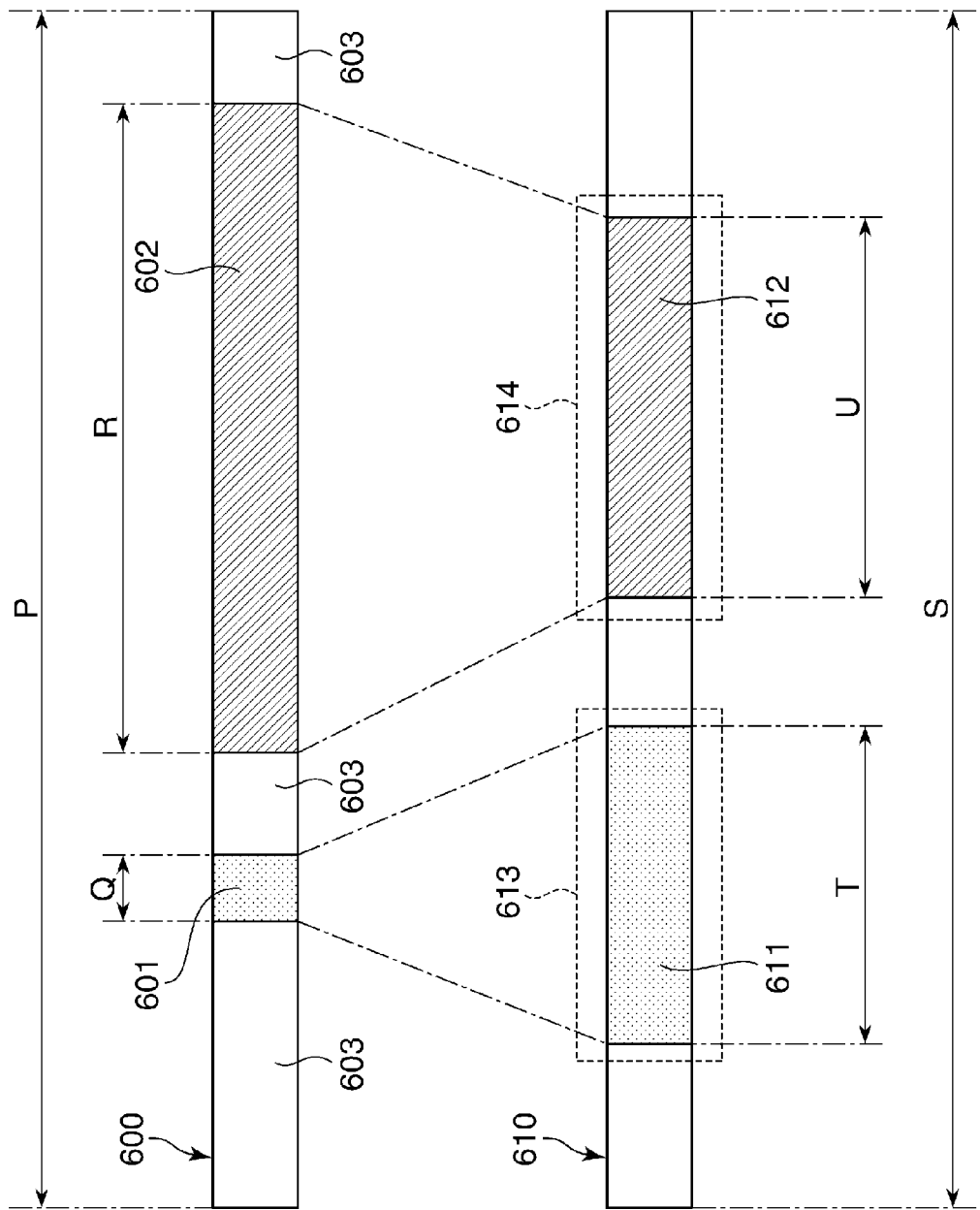

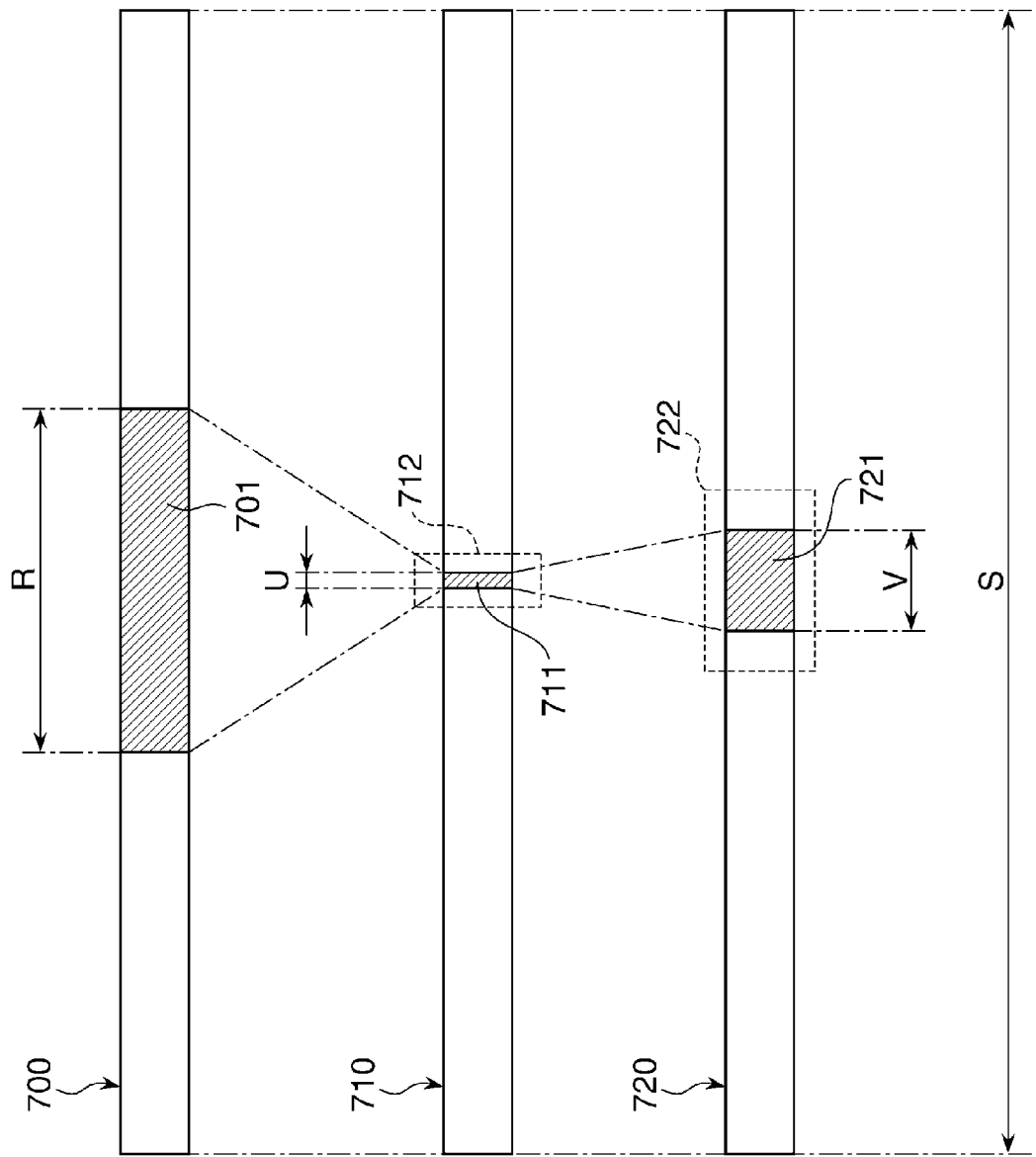

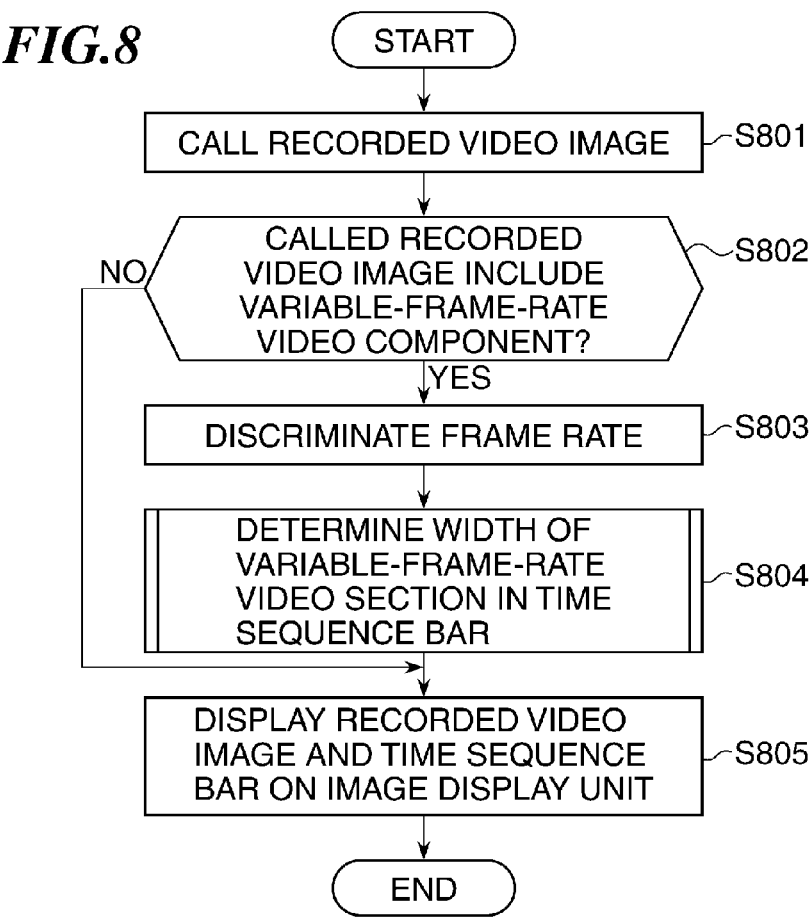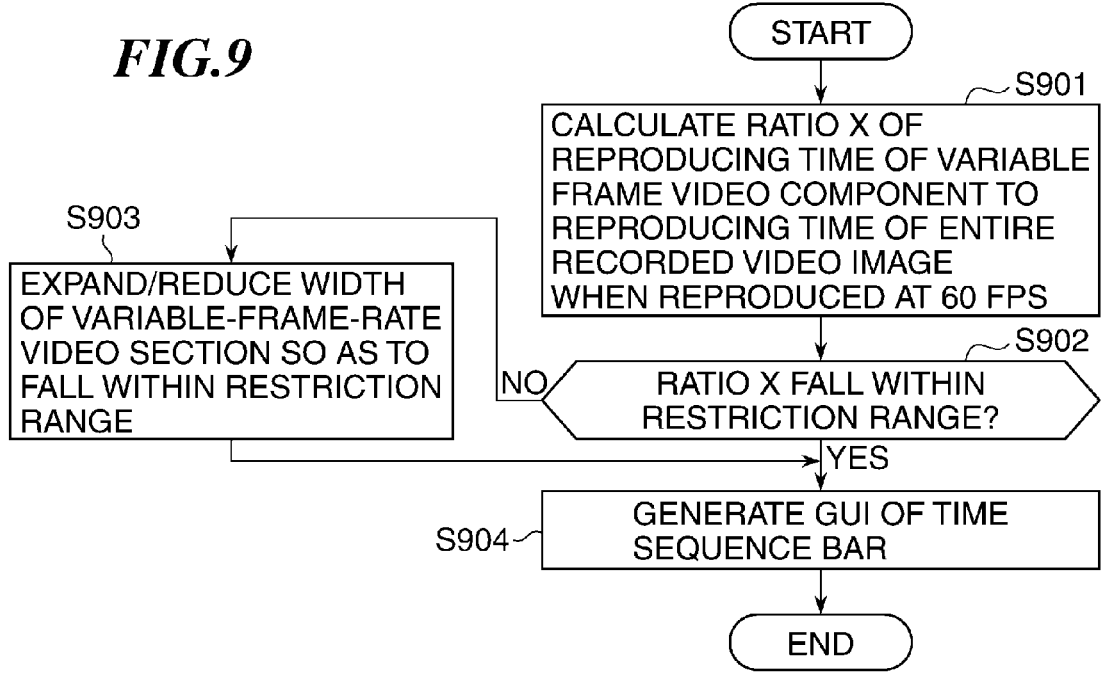

FIG.11
PRIOR ART
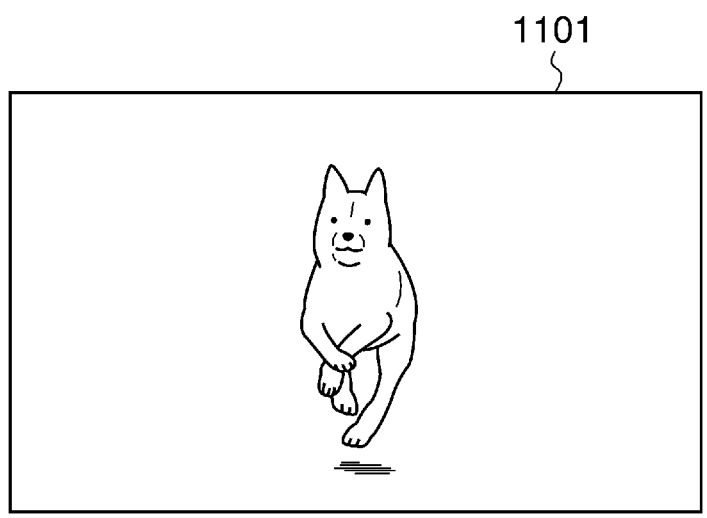
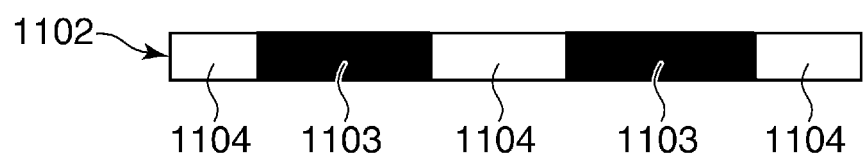

VIDEO REPRODUCING APPARATUS, DISPLAY CONTROL METHOD THEREFOR, AND STORAGE MEDIUM STORING DISPLAY CONTROL PROGRAM THEREFOR

BACKGROUND OF THE INVENTION

1. Field of the Invention

The present invention relates to a video reproducing apparatus that is capable of reproducing a video image in which video components taken at different frame rates are mixed, a display control method therefor, and a storage medium storing a display control program therefor.

2. Description of the Related Art

In a technical field of image pickup apparatuses, such as digital cameras and digital video cameras, there is a known technique to take video while changing a frame rate at the time of taking video. In general, a video image is taken at a normal frame rate, and the frame rate of the reproduction speed is equalized to the frame rate of taking the video. In this case, a motion of a subject at the time of reproduction is almost the same as a motion of the subject at the time of taking (a single-speed reproduction).

On the other hand, when video taken at a frame rate higher than the frame rate at which the normal video taking is performed is reproduced at the reproduction speed that is the same as the frame rate at which the normal video taking is performed, the video becomes slower than the single-speed reproduction (slow reproduction). On the contrary, when video taken at a frame rate lower than the frame rate at which the normal video taking is performed is reproduced at the reproduction speed that is the same as the frame rate at which the normal video taking is performed, the video becomes faster than the single-speed reproduction (fast reproduction).

The video taking at a high frame rate is useful to take a high speed subject, and enables to analyze a motion of the subject that is not caught with the naked eye. On the other hand, the video taking at a low frame rate is useful to take a low speed subject (for example, plant growth, a motion of a celestial body), a variation over long time (for example, traffic of persons in a street), etc. with small memory capacity.

When video in which video components taken at a frame rate that is different from the normal one and a video component taken at the normal frame rate are mixed is reproduced, it becomes necessary to indicate a position of each video component in the entire video. Accordingly, for example, the display method shown in FIG. 11 is proposed in Japanese Laid-Open Patent Publication (Kokai) No. 2007-166501 (JP 2007-166501A).

FIG. 11 is a view showing a conventional screen example that shows a configuration (distribution) of frame rates in a reproduced video image to a user at the time of reproducing the video image. In the display example in FIG. 11, a reproduction video image 1101 is displayed on a screen, and an oblong time sequence bar 1102 that indicates a time course of the reproduction video image 1101 is simultaneously displayed below the reproduction video image 1101. On the time sequence bar 1102, a high-frame-rate video section 1103 that shows a video component taken at a high frame rate, and a normal-frame-rate video section 1104 that shows a video component taken at a normal frame rate are indicated. Moreover, JP 2007-166501A discloses the configuration that can switch a mode between a high-frame-rate reproduction mode for reproducing in the same time course at the time of the video taking and a slow reproduction mode for reproducing slowly as compared with the time course at the time of the video taking, when the video component taken at the high frame rate is reproduced.

However, the above-mentioned prior art does not consider a procedure for arranging the high-frame-rate video section 1103 on the time sequence bar 1102. Moreover, it does not consider the basic data for generating the high-frame-rate video section 1103, a condition and a method for displaying the high-frame-rate video section 1103. Accordingly, the above-mentioned prior art causes the following problems.

That is, it is supposed that the high-frame-rate video section 1103 is indicated on the time sequence bar 1102 based on actual taking time length. In that case, the width of the high-frame-rate video section 1103 may become relatively extremely short with respect to the entire length of the time sequence bar 1102 (actual taking time length). This is because the video taken at the high frame rate is mainly used to take a momentary quick motion. That is, when the width of the high-frame-rate video section 1103 becomes relatively extremely short with respect to the entire length of the time sequence bar 1102, it becomes difficult for a user to identify the high-frame-rate video section 1103 visually. The above-mentioned publication does not analyzes generation and processing of the high-frame-rate video section 1103 on the time sequence bar 1102 against such a problem.

SUMMARY OF THE INVENTION

The present invention relates to a video reproducing apparatus that allows a user to visually identify a video component taken at a frame rate that is different from the normal frame rate on a time sequence bar at the time of reproduction of a video image in which video components taken at different frame rates are mixed.

Accordingly, a first aspect of the present invention provides a video reproducing apparatus comprising a reproduction unit configured to reproduce a video image in which video components taken at different frame rates are mixed and to display the video image on a display unit, and a display control unit configured to display a single sequence bar for the video image on the display unit, wherein the display control unit controls the display of the sequence bar so that a ratio of the length of a second section to time required to take a second video component is larger than a ratio of the length of a first section to time required to take a first video component, when the video image includes the first video component taken at a first frame rate and the second video component taken at a second frame rate higher than the first frame rate, and when the first section indicating the first video component and the second section indicating the second video component are indicated on the sequence bar.

Accordingly, a second aspect of the present invention provides a video reproducing apparatus comprising a display unit, a reproduction unit configured to reproduce a video image in which video components taken at different frame rates are mixed and to display the video image on the display unit, and a display control unit configured to display a single sequence bar for the video image on the display unit, wherein the display control unit controls the display of the sequence bar so that a ratio of the length of a third section to time required to take a third video component is smaller than a ratio of the length of a first section to time required to take a first video component, when the video image includes the first video component taken at a first frame rate and the third video component taken at a third frame rate lower than the first frame rate, and when the first section indicating the first video component and the third section indicating the third video component are indicated on the sequence bar.

Accordingly, a third aspect of the present invention provides a video reproducing apparatus comprising a reproduction unit configured to reproduce a video image in which video components taken at different frame rates are mixed at a specific frame rate and to display the video image on a display unit, and a display control unit configured to display a single sequence bar for the video image on the display unit, wherein the display control unit controls to display a first section indicating a first video component on the sequence bar with a length based on a time length required to reproduce the first video component at the specific frame rate and to display a second section indicating a second video component on the sequence bar with a length based on a time length required to reproduce the second video component at the specific frame rate, when the video image includes the first video component taken at a first frame rate and the second video component taken at a second frame rate higher than the first frame rate.

According to the present invention, a user is able to visually identify the video component taken at a frame rate that is different from the normal frame rate on a time sequence bar at the time of reproduction of the video image in which video components taken at different frame rates are mixed.

Further features of the present invention will become apparent from the following description of exemplary embodiments with reference to the attached drawings.

BRIEF DESCRIPTION OF THE DRAWINGS

FIG. 1 is a block diagram showing a functional configuration of a digital video camera according to an embodiment of the present invention.

FIG. 3 is a view schematically showing frame rate information that an image processing unit adds to video data in the digital video camera in FIG. 1.

FIG. 5 is a view showing an example of a reproduction screen of a recorded video image displayed on a display screen of the digital video camera in FIG. 1.

FIG. 6 is a view schematically showing a generation process for a variable-frame-rate video section indicated on a time sequence bar shown in FIG. 5.

FIG. 7 is a view schematically showing an example that restricts an expansion/reduction process for the variable-frame-rate video section shown in FIG. 6.

FIG. 8 is a flowchart showing the expansion/reduction process for the variable-frame-rate video section shown in FIG. 6.

FIG. 9 is a flowchart showing a detail of the process in step S1018 in FIG. 8.

FIG. 11 is a view showing a conventional screen example that shows a configuration(distribution) of frame rates in a reproduced video image to a user at the time of reproducing the video image.

DESCRIPTION OF THE EMBODIMENTS

Figure 2A:
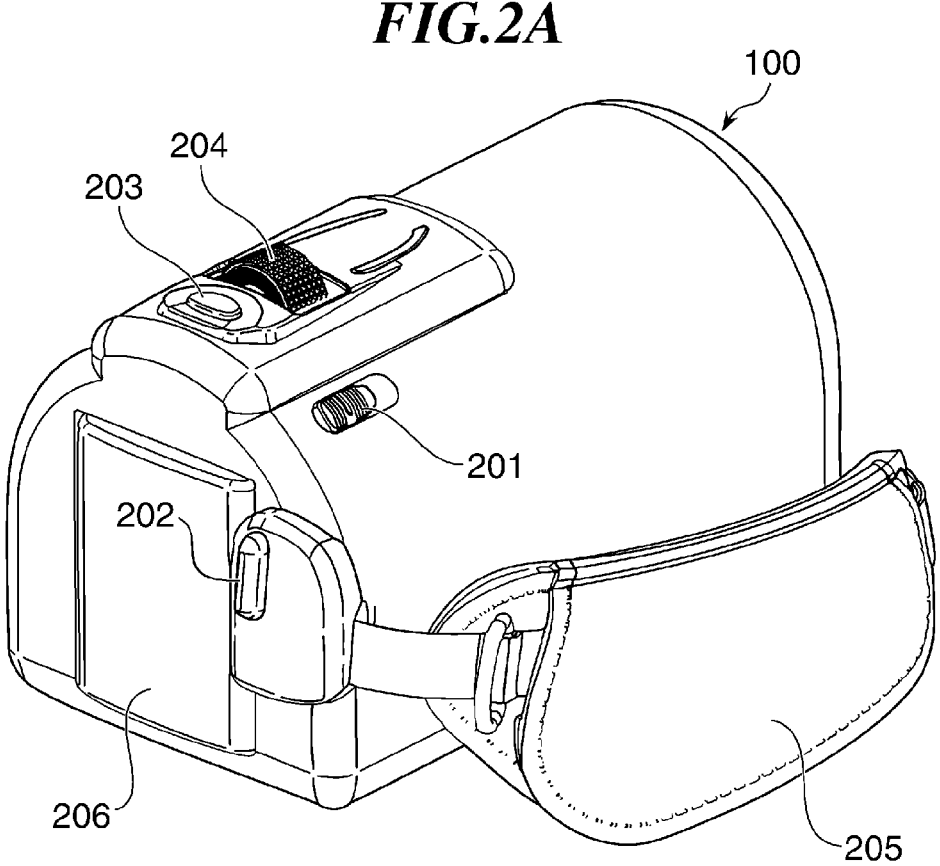
FIG. 2A and FIG. 2B are perspective views showing an appearance structure of the digital video camera in FIG. 1.

Hereafter, embodiments according to the present invention will be described in detail with reference to the drawings.

In the following description, a digital video camera that can take a video image at different frame rates and can reproduces the taken video image with different reproduction speeds shall be taken up as an example of the video reproducing apparatus.

<Outline Configuration of Digital Video Camera>

FIG. 1 is a block diagram showing a functional configuration of a digital video camera 100 according to an embodiment of the present invention. The digital video camera 100 is provided with a control unit 101, a ROM 102, an operational input unit 103, an image pickup unit 104, an A/D convertor 105, an image processing unit 106, a storage medium 107, and an image display unit 108.

The control unit 101 controls operations of sections (blocks) with which the digital video camera 100 is provided. The control unit 101 controls the operations of the respective sections by reading an operation (control) program for the digital video camera 100 stored in the ROM 102, developing onto a work area of a RAM (not shown), and executing the program. The ROM 102 is a rewritable nonvolatile storage memory, and stores the program for controlling operations of the digital video camera 100, set values, such as parameters required for executing the program, and data like a GUI that is displayed on the image display unit 108.

The operational input unit 103 is an input interface with which the digital video camera 100 is provided, and when an operational input is performed by a user, the inputted operation content is transmitted to the control unit 101. In this embodiment, the operational input unit 103 includes a touch panel sensor arranged on the image display unit 108 besides mechanical switches, such as a trigger switch and a mode switch, for example. The touch panel sensor detects a touch input from a user, and a content of the detected touch input is transmitted to the control unit 101.

The image pickup unit 104 is an image pickup device, such as a CCD sensor and a CMOS sensor, for example, photo-electrically converts a subject image formed on the image pickup device through an image pickup optical system including lenses and an aperture stop, and transmits the generated analog image signal to the A/D convertor 105. The A/D convertor 105 applies an A/D conversion process to the inputted analog image signal, and transmits the obtained digital image data to the image processing unit 106. Moreover, the A/D convertor 105 successively outputs the obtained digital image data to the image display unit 108 to make the image display unit 108 function as an electronic view finder, when the digital video camera 100 is in a recording mode, for example.

The image processing unit 106 applies various kinds of image processes and an expansion/reduction process to the inputted digital image data. The image processing unit 106 sequentially accumulates the digital image data to which the various processes were applied into the RAM (not show), and codes the data of the obtained image group with frame rate information, which consists of taking time, frame rate, etc. at the time of taking, into video data in the AVCHD format. Moreover, the image processing unit 106 reads and decodes the coded video data that is recorded (saved) in the storage medium 107 under the control by the control unit 101, and outputs the decoded video data to the image display unit 108. Furthermore, the image processing unit 106 applies the various image processes and the expansion/reduction process to the video data and the GUI data stored in the ROM 102, composites them, and outputs the composite video data to the image display unit 108.

The storage medium 107 records (saves) the video data generated by the image processing unit 106. Specifically, the storage media 107 is a recording device, such as an internal memory of the digital video camera 100, a memory card, or an HDD that is detachably connected to the digital video camera 100. The image display unit 108 is a display unit like a small liquid crystal display (LCD), for example, and is used for displaying a taking image (video), video data recorded in the storage medium 107, setup information about the digital video camera 100, etc. Although the touch panel sensor is arranged on the image display unit 108 in this embodiment as mentioned above, the touch panel sensor is not necessarily required. Any well-known method (technique) may be used for detecting input operations through the touch panel sensor.

In this embodiment, the digital video camera 100 is able to take a video image at three kinds of frame rates that are 60 frames per second (60 FPS, a first frame rate), 360 FPS (a second frame rate), and 30 FPS (a third frame rate). This is to facilitate understanding the present invention by simplifying the description about the video taking/reproducing process by the digital video camera 100. Actually, the digital video camera 100 can take video at more kinds of frame rates.

A user selects a taking mode from among a normal mode of 60 FPS, a high-frame-rate taking mode of 360 FPS that is higher than the frame rate in the normal mode, and a low-frame-rate taking mode of 30 FPS that is lower than the frame rate in the normal mode. Then, the user takes video. Hereinafter, video taken in the normal mode is called a "normal-frame-rate video", video taken in the high-frame-rate taking mode is called a "high-frame-rate video", and video taken at the low frame rate is called a "low-frame-rate video".

The digital video camera 100 has a single-speed reproduction mode and a variable-speed reproduction mode containing a slow reproduction mode and a high speed reproduction mode as reproduction modes for the video taken in these taking modes.

The "single-speed reproduction" shall refer to a reproducing method for reproducing the video at the taking frame rate (to equalize the frame rate for reproducing video with the frame rate for taking video). In the "single-speed reproduction", a motion of a subject while taking video and a motion of the subject in the reproducing video become approximately identical velocity. For example, when the video taken at a frame rate that is higher than the normal frame rate is reproduced with the single-speed reproduction, it will be reproduced at a reproduction speed that is higher than the normal reproduction speed. It should be noted that the single-speed reproduction is also achieved by reproducing the video taken at the frame rate of 360 frames per second at 60 frames per second while thinning out every six frames.

The "slow reproduction" shall refer to the reproducing method for reproducing the video at the frame rate lower than the taking frame rate (to lower the frame rate for reproducing video than the frame rate for taking video). In the "slow reproduction", a motion of a subject in reproducing video becomes slower than a motion of the subject while taking video.

The "fast reproduction" shall refer to the reproducing method for reproducing the video at the frame rate higher than the taking frame rate (to raise the frame rate for reproducing video than the frame rate for taking video). In the "fast reproduction", a motion of a subject in reproducing video becomes faster than a motion of the subject while taking video. It should be noted that these "slow reproduction" and "fast reproduction" are brought together and called a "variable speed reproduction".

<Outline Configuration of Digital Video Camera 100>

Figure 2B:
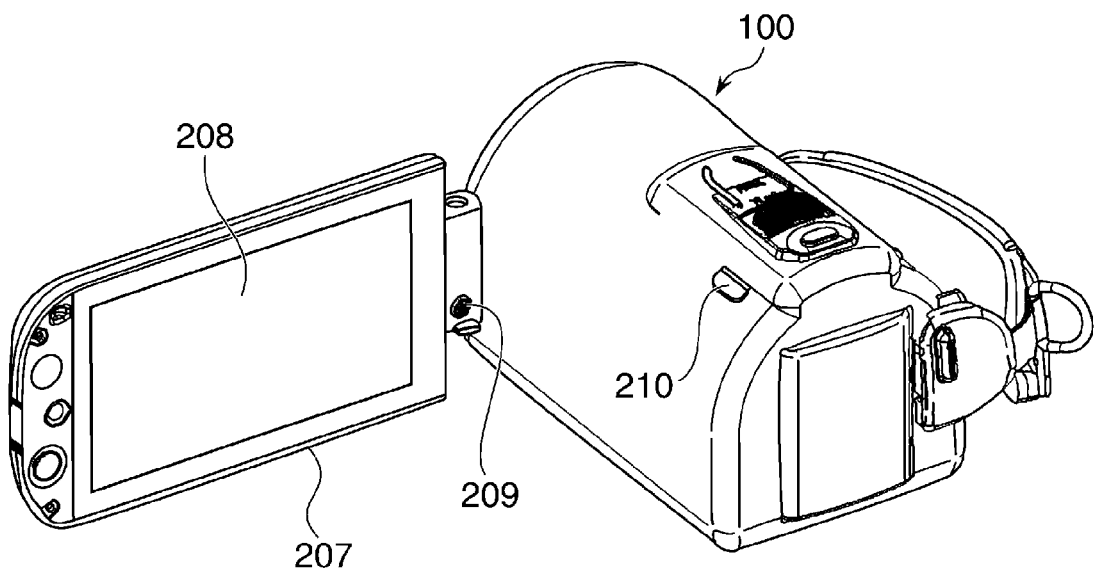

FIG. 2A and FIG. 2B are perspective views showing an appearance structure of the digital video camera 100 in FIG. 1. FIG. 2A is a view mainly showing the upper side and the right side that are viewed from the rear side of the digital video camera 100. FIG. 2B is a view mainly showing the upper side and the left side that are viewed from the rear side of the digital video camera 100.

The image pickup unit 104, the storage medium 107, a control board, etc., which are not shown in FIG. 2A and FIG. 2B, are built in the camera body of the digital video camera 100. The control unit 101, the A/D convertor 105, and the image processing unit 106 are mounted on the control board. As shown in FIG. 2A, the digital video camera 100 is provided with a grip belt 205 used when a user holds the camera body. Moreover, a battery that supplies electric power to the digital video camera 100 is contained in a battery box (not shown), and FIG. 2A shows a state where the battery box is closed by a lid member 206.

Moreover, a mode switch 201 that is used to change the mode between a taking mode and a reproduction mode is arranged at the upper right side of the camera body that is viewed from the rear side, as shown in FIG. 2A. Moreover, a trigger switch 202 that starts and stops taking video in the taking mode is arranged at the rear side of the camera body. A frame rate switch 203 for changing a frame rate in the taking mode and the reproduction mode, and a frame rate dial 204 that changes a frame rate by a rotary operation in the taking mode and the reproduction mode are arranged at the top side of the camera body.

As shown in FIG. 2B, at the left side of the camera body that is viewed from the rear side, a display unit 207 having a display screen 208 that displays taking video (movie) and reproduces recorded video is openably/closably attached through a hinge 209. The touch panel (not shown) is provided on the surface of the display screen 208. A user can perform input operations by touching the touch panel with feeling of a touch on an image or an icon displayed on the display screen 208. It should be noted that the display unit 207 is included in the image display unit 108 shown in FIG. 1. At the upper left side of the camera body viewed from the rear side, a power switch 210 that turns ON/OFF the power of the digital video camera 100 is arranged.

<Recording Video in Taking Mode>

When taking video using the digital video camera 100, a user puts the right hand through the grip belt 205 of the digital video camera 100 in which the battery is installed, and holds the camera body so that the top side of the camera body is covered by the right hand. Then, the user operates the power switch 210 to turns on the power, and opens the display unit 207 so as to see the display screen 208. When the digital video camera 100 was set in the reproduction mode, the user slides the mode switch 201 to change the mode to the taking mode. In the taking mode, the video image obtained with the image pickup optical system and the image pickup unit 104 is displayed on the display screen 208. A push of the trigger switch 202 starts/stops taking video. When video taking starts, the taken video data is recorded in the storage medium 107 successively.

When the user wants to change the frame rate of the taking video while taking the video under the operation of the trigger switch 202, the user has only to push the frame rate switch 203 while taking the video. When the frame rate switch 203 is operated, the frame rate information of the taking video is displayed on the screen 208, and the frame rate dial 204 becomes operational. The user can select a desired frame rate by rotationally operating the frame rate dial 204. When the user again pushes the frame rate switch 203 under the condition where the desired frame rate is selected, the frame rate of the taking video is changed to the selected frame rate, and the video is continuously taken.

It should be noted that the frame rate can be changed by the similar operation in the state where the video is not taken (in a taking idle state including a record pause state) in the taking mode. When the frame rate switch 203 is pushed in the taking idle state, the frame rate information that is currently set up is displayed on the display screen 208, and the frame rate dial 204 becomes operational. When the user again pushes the frame rate switch 203 under the condition where the desired frame rate is selected by the rotational operation of the frame rate dial 204, the setting of the frame rate is changed, and the setting will be effective from the following video taking.

During taking video, the video data is transmitted from the A/D convertor 105 to the image processing unit 106. The image processing unit 106 adds the frame rate information to the received video data, converts it into the AVCHD format, and codes it. Then, the coded video data is transmitted to the storage medium 107, and recorded.

FIG. 3 is a view schematically showing the frame rate information that the image processing unit 106 adds to the video data recorded in the storage medium 107. It should be noted that the frame rate information is calculated and processed by the control unit 101 during taking video. In an information bar 300 showing the frame rate information, timing at which the frame rate is changed and a taking time length during which video is taken at the changed frame rate are indicated with respect to the entire time length of one scene. In the information bar 300, the left edge indicates the taking start timing of the video, and the right edge indicates the taking stop timing of the video. Above the information bar 300, the time progress from the taking start timing to the taking stop timing is shown. The taking time length (record time) of the video is 15 minutes and 0 seconds in this example.

A broken line 306 indicated on the information bar 300 shows timing of changing the frame rate, and the time indicated above a broken line 306 shows elapsed time from the taking start timing. The frame rate at which the video is taken and the taking time length of the video taken at the frame rate are indicated in each range divided with the broken lines 306. Accordingly, a range 301 shows that the video is taken at 60 FPS for 2 minutes and 15 seconds from 00:00 to 02:15. In the same manner, a range 302 shows that the video is taken at 360 FPS for 0 minutes and 30 seconds from 02:15 to 02:45. Each of ranges 303, 304, and 305 also shows that the video is taken at a specific frame rate for a certain period as shown in FIG. 3.

The image processing unit 106 adds the frame rate information (a frame rate, a change timing of the frame rate, and the taking time length of the video taken at each frame rate) to the video data, and records the data into the storage medium 107.

<Displaying Video in Reproduction Mode>

The user can change the mode of the digital video camera 100 to the reproduction mode in which the video recorded in the storage medium 107 (referred to as "a recorded video image", hereafter) is reproduced by sliding the mode switch 201 to a reproduction mode position. In the reproduction mode, the user can switch between the single-speed reproduction mode and the variable-speed reproduction mode in which the slow reproduction or the fast reproduction is performed by further depressing the frame rate switch 203.

When the frame rate switch 203 is depressed, the frame rate information that is currently set for reproducing the recorded video image is displayed on the display screen 208, and the frame rate dial 204 becomes operational. The user can select a frame rate for reproducing the recorded video image by rotationally operating the frame rate dial 204. When the user again pushes the frame rate switch 203 under the condition where the desired frame rate is selected, the frame rate for reproducing the recorded video image is changed to the selected frame rate, and it is set.

With reference to FIG. 4 through FIG. 7, the aspect of the reproduction of the recorded video image in the reproduction mode of the digital video camera 100 will be described. In the following description, the reproduction mode shall be set to the variable-speed reproduction mode in this embodiment.

[Multiple Indication of Thumbnail Images]

Figure 4:
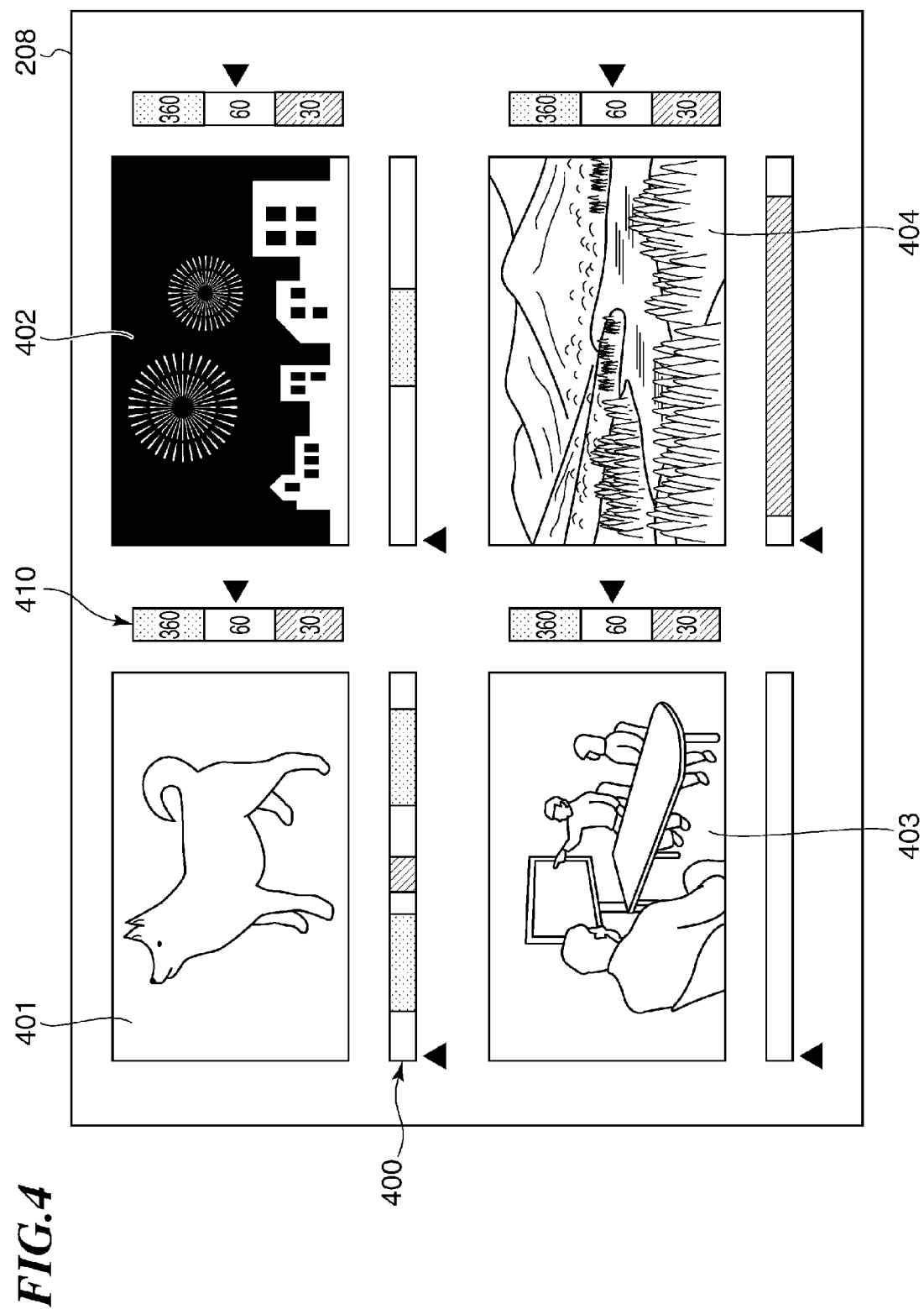
FIG. 4 is a screen example of a multiple indication of thumbnail images of recorded video images displayed at the time when a taking mode is changed to a reproduction mode in the digital video camera in FIG. 1.

FIG. 4 is a screen example of multiple indication of thumbnail images of recorded video images displayed on the display screen 208 at the time when the taking mode is changed to the reproduction mode. Here, an example in which the thumbnail images 401, 402, 403, and 404 are arranged as a matrix of two columns in vertical and two lines in horizontal is shown. It should be noted that each of the thumbnail images 401 through 404 is a representative image of the entire scene of each recorded video image. Moreover, when four or more recorded video images are recorded in the storage medium 107, an icon (not shown) for moving to the "next page" will be displayed so as to enable the page to move.

The thumbnail image 401 accompanies a single time sequence bar 400 that is horizontally arranged below the thumbnail image 401 and a single frame rate bar 410 that is vertically arranged on the right side of the thumbnail image 401. The time sequence bar 400 and the frame rate bar 410 are displayed beside each of the thumbnail images 401 through 404.

[Single Indication of Recorded Image]

When a user touches a desired thumbnail image that the user wants to reproduce from among the thumbnail images 401 through 404 as shown in FIG. 4, the multiple indication in FIG. 4 is changed to a single indication in FIG. 5, and reproduction of the recorded video image will be started. FIG. 5 is a view showing an example of the reproduction screen of the recorded video image displayed on the display screen 208. The reproduction video 500 under reproduction is displayed on the display screen 208, the time sequence bar 400 is displayed below the reproduction video 500, and the frame rate bar 410 is displayed on the right side of the reproduction video 500.

[Display Form of Time Sequence Bar 400]

The time sequence bar 400 indicates the time sequence of the entire recorded video image under reproduction, the left edge indicates the reproduction starting position of the recorded video image, and the right edge indicates the reproduction ending position of the recorded video image. The recorded video under reproduction includes high-frame-rate video components (second video components) that are taken at the high frame rate of 360 FPS and are recorded. The time sequence bar 400 includes corresponding high-frame-rate video sections 501 and 503 (second sections). Moreover, the recorded video under reproduction includes a low-frame-rate video component (a third video component) that is taken at the low frame rate of 30 FPS and is recorded. The time sequence bar 400 includes a corresponding low-frame-rate video section 502 (a third section). The components other than the high-frame-rate video components and the low-frame-rate video component are normal-frame-rate video components (first video components) that are taken at the normal frame rate of 60 FPS. That is, the sections other than the high-frame-rate video sections 501, 503 and the low-frame-rate video section 502 are normal-frame-rate video sections (first sections) that are taken at the normal frame rate.

The variable-frame-rate video sections (the high-frame-rate video sections 501, 503 and the low-frame-rate video section 502) are classified by colors or background patterns for every frame rate so that the sections can be distinguished. Thereby, the user can recognize a frame rate easily.

The user can designate a video component to reproduce by touching a specified position on the time sequence bar 400. That is, when the user touches a touch area 501a indicated by a broken line shown in FIG. 5, the head of the video component of the high-frame-rate video section 501 can be found and the slow reproduction can be directly performed. Similarly, when the user touches a touch area 503a, the head of the video component of the high-frame-rate video section 503 can be found and the slow reproduction can be directly performed. Moreover, when the user touches a touch area 502a indicated by a broken line, the head of the video component of the low-frame-rate video section 502 can be found and the fast reproduction can be directly performed.

Moreover, when the user touches a normal-frame-rate video section, the head of the video component of the touched normal-frame-rate video section can be found and the normal reproduction can be directly performed. These direct operations may be also performed on the multiple indication screen shown in FIG. 4.

A reproduction position pointer 504 is accompanied and displayed below the time sequence bar 400. A reproduction position pointer 504 shows the time progress of the recorded video image under reproduction, and is pointing the reproducing position on the time sequence bar 400. The reproduction position pointer 504 moves as the progress of the reproducing time of the recorded video image, moves rightward during reproducing, moves leftward during rewinding, and gives the user the current reproduction position on the time sequence bar 400.

Next, a display control process for displaying variable-frame-rate video sections on the time sequence bar 400 will be described. In a recorded video image in which a variable-frame-rate video component and a normal-frame-rate video component are mixed, the situation where the variable-frame-rate video component becomes extremely short or becomes extremely long with respect to the sequence of the entire recorded video image is assumed because of singularity of the taking status using the variable frame rate. Particularly, the problem can occur notably, when a variable-frame-rate video section is indicated so that a taking time length is always proportional to a width (length) on the information bar 300 as shown in FIG. 3. How to solve this problem will be described with reference to FIG. 6 and FIG. 7.

FIG. 6 is a view schematically showing a generation process for a variable-frame-rate video section indicated on the time sequence bar 400. A time sequence bar 600 shown in the upper side in FIG. 6 shows the recorded video image in which normal-frame-rate video components and variable-frame-rate video components are mixed, and illustrates the information bar 300 shown in FIG. 3. That is, the left edge of the time sequence bar 600 indicates the reproduction starting time of the recorded video image, and the right edge indicates the reproduction ending time.

The time sequence bar 600 includes a high-frame-rate video section 601 taken at the high frame rate, a low-frame-rate video section 602 taken at the low frame rate, and normal-frame-rate video sections 603 taken at the normal frame rate. On the time sequence bar 600, the variable-frame-rate video sections (the high-frame-rate video section 601, and the low-frame-rate video section 602) are indicated with widths corresponding to the actual taking time lengths.

When the variable-frame-rate video sections are indicated with the lengths corresponding to the actual taking time lengths as shown in the time sequence bar 600, the width Q of the high-frame-rate video section 601 becomes short, and the width R of the low-frame-rate video section 602 becomes long. When the variable-frame-rate video section is indicated with the short width like the high-frame-rate video section 601, it becomes difficult for the user to visually identify its position. Moreover, the narrowed touch area causes problems, such as difficulty of the direct reproduction operation of the variable-frame-rate video section. Furthermore, since the width of the variable-frame-rate video section does not agree with the reproducing time of the variable speed reproduction in the variable-speed reproduction mode, it becomes difficult for the user to grasp the ratio of the reproducing time of the variable-frame-rate video component to the reproducing time of the entire recorded video image. Accordingly, the time sequence bar 600 is changed to a time sequence bar 610 shown in the lower side in FIG. 6.

The time sequence bar 600 is obtained by applying an expansion/reduction process to the time sequence bar 610 so that the width of the variable-frame-rate video section agrees with the variable speed reproducing time length. It should be noted that the detail (the operation method) of this expansion/reduction process will be mentioned later.

The left edge of the time sequence bar 610 indicates the reproduction starting time of the recorded video image, and the right edge indicates the reproduction ending time in the same manner as the time sequence bar 600. The high-frame-rate video section 611 (width T) on the time sequence bar 610 is obtained by expanding the high-frame-rate video section 601 (width Q) on the time sequence bar 600 in the longitudinal direction of the time sequence bar 610. Moreover, the low-frame-rate video section 612 (width U) on the time sequence bar 610 is obtained by reducing the low-frame-rate video section 602 (width R) on the time sequence bar 600 in the longitudinal direction of the time sequence bar 610.

An expansion/reduction ratio for each variable-frame-rate video section is determined based on the reproducing time at the time of the variable speed reproduction of each variable-frame-rate video component in the variable-speed reproduction mode. For example, when the high-frame-rate video component that is taken for 30 seconds at 360 FPS is reproduced with the variable speed reproduction (the slow reproduction) at 60 FPS, the reproducing time will be 180 seconds (6 times of the taking time). Moreover, when the low-frame-rate video component that is taken for 420 seconds at 30 FPS is reproduced with the variable speed reproduction (the fast reproduction) at 60 FPS, the reproducing time will be 210 seconds (0.5 times of the taking time).

When the width P of the entire scene of the time sequence bar 600 (the actual taking time) is assumed as 15 minutes (900 seconds) at this time, the width S of the time sequence bar 610 (the actual reproducing time) will be 14 minutes (840 seconds) by calculating a fluctuated part of the reproducing time of the variable-frame-rate video components. The ratio of the reproducing time of each variable-frame-rate video component to the actual reproducing time of the entire scene is represented as the width of each variable-frame-rate video section on the time sequence bar 610. That is, the width of each variable-frame-rate video section is defined by the ratio of 180 seconds/840 seconds (width T/width S) for the highframe-rate video section 611, and the ratio of 210 seconds/ 840 seconds (width U/width S) for the low-frame-rate video section 612.

A touch area is set up to each variable-frame-rate video section on the time sequence bar 610. That is, a touch area 613 is set up according to the width of the high-frame-rate video section 611 to which the expansion process was applied, and a touch area 614 is set up according to the width of the low-frame-rate video section 612 to which the reduction process was applied.

Here, a setting of a restriction width will be considered so that a variable-frame-rate section does not become too short or too long by restricting the expansion/reduction process using a threshold. This is because the problem that the width of the high-frame-rate video section becomes extremely large on the time sequence bar by indicating the expanded high-frame-rate video section, for example, may arise. Moreover, this is because the problem that the width of the low-frame-rate video section becomes extremely short on the time sequence bar by indicating the reduced low-frame-rate video section, on the contrary, may arise.

As the threshold that restricts the expansion/reduction process for the variable-frame-rate video section, the ratios, such as "width T/width S" and "width U/width S", or the values, such as the width T and the width U, shown in the time sequence bar 610 may be employed, for example. However, it is necessary to set up the threshold appropriately in consideration of the size of the display screen and the entire length of the time sequence bar 400 or 610 displayed on the display screen 208.

FIG. 7 is a view schematically showing an example that restricts the expansion/reduction process for the variable-frame-rate video section using the threshold. Three kinds of time sequence bars 700, 710, and 720 are shown in FIG. 7 for the recorded video image in which the normal-frame-rate video component and the low-frame-rate video component are mixed. It should be noted that the low-frame-rate video component shall be taken at 6 FPS that is 1/10 of the normal frame rate, exceptionally, in order to describe the restriction of the expansion/reduction process for the variable-frame-rate video section clearly. Moreover, the entire lengths of the time sequence bars 700, 710, and 720 are adjusted to "width S" in order to simplify the description.

The time sequence bar 700 is generated based on the actual taking time length, and includes a low-frame-rate video section 701 (width R). In contrast to the time sequence bar 700, the time sequence bar 710 is obtained by applying the reduction process to the length of the low-frame-rate video section 701 according to the variable speed reproducing time length. That is, since the video taken at 6 FPS is reproduced at 60 FPS, the reproducing time will be 1/10. As a result, the width U of the low-frame-rate video section 711 in the time sequence bar 710 is equal to the length that is obtained by reducing the width R of the low-frame-rate video section 701 on the time sequence bar 700 by 1/10 (U/R=1/10) in the longitudinal direction.

A touch area 712 corresponding to the low-frame-rate video section 711 is indicated on the time sequence bar 710. As shown on the time sequence bar 710, since the indication area of the reduced low-frame-rate video section 711 is significantly narrow with respect to the entire length of the time sequence bar 710, the user is difficult to visually identify the touch area 712. Moreover, since the area of the touch area 712 is small, a touch operation is not easy.

Accordingly, the threshold (restriction width) of "the reduction process is allowed as long as the section width is more than 1/10 of the entire length of the time sequence bar" is set to the expansion/reduction process for the variable-frame-rate video section, and the reduction process is restricted. A time sequence bar 720 is obtained by applying the reduction process to the low-frame-rate video section 701 while applying the threshold restriction to the time sequence bar 700.

The width V of the low-frame-rate video section 721 in the time sequence bar 720 is not reduced to less than 1/10 of the width S according to the threshold of "the section width is more than 1/10 of the entire length of the time sequence bar". Then, a touch area 722 to the low-frame-rate video section 721 is set on the time sequence bar 720. Thus, since the reduction process to the low-frame-rate video section is restricted, the user can visually identify the low-frame-rate video section 721 satisfactorily, and can also perform a touch operation easily.

In such a time sequence bar on the reproduction time basis (based on the reproduction time), the width of the high-frame-rate video component is expanded and indicated as longer than the width corresponding to the actual taking time length as described with reference to FIG. 6 and FIG. 7. On the contrary, the width of the low-frame-rate video component is reduced and indicated as shorter than the width corresponding to the actual taking time length. That is, the time sequence bar is displayed so that the ratio of the length of the second section to the time required to take the second video component at the high frame rate is larger than the ratio of the length of the first section to the time required to take the first video component at the normal frame rate. Moreover, the time sequence bar is displayed so that the ratio of the length of the third section to the time required to take the third video component at the low frame rate is smaller than the ratio of the length of the first section to the time required to take the first video component at the normal frame rate.

FIG. 8 is a flowchart showing the expansion/reduction process for the variable-frame-rate video section in the time sequence bar. It should be noted that the process shown in the flowchart in FIG. 8 is executed for displaying the recorded video and the time sequence bar on the display screen 208, when the digital video camera 100 is changed from the taking mode to the reproduction mode. Each process in FIG. 8 is executed because the control unit 101 develops the program stored in the ROM 102 to the work area of the RAM and executes the developed program.

In step S801, the control unit 101 controls the image processing unit 106 to call a recorded video image from the storage medium 107. In the next step S802, the control unit 101 reads the frame rate information added to the recorded video image called in the step S801, and determines whether the variable-frame-rate video component is included in the called recorded video image. It should be noted that the frame rate information is read from the information bar 300 shown in FIG. 3. When the variable-frame-rate video component is included (YES in the step S802), the control unit 101 proceeds with the process to step S803. When the variable-frame-rate video component is not included (NO in the step S802), the process proceeds to step S805.

In the step S803, the control unit 101 discriminates the record time (the taking time) of the variable-frame-rate video component, the record timing (the start timing and the end timing of the image taking (reproduction)), and the frame rate from the frame rate information included in the recorded video image read in the step S802. In the next step S804, the control unit 101 determines the width of the variable-frame-rate video section on the time sequence bar based on the information discriminated in the step S803, and performs a display process. A detail of the step S804 will be described later with reference to FIG. 9. In the next step S805, the control unit 101 displays the display image (GUI) of the time sequence bar generated in the step S804 with the recorded video image on the image display unit 108 through the image processing unit 106.

FIG. 9 is a flowchart showing the detail of the process in the step S804. In step S901, the control unit 101 calculates the reproducing time of the variable-frame-rate video component under the normal reproduction (reproduced at 60 FPS) and the reproducing time of the entire recorded video image under the normal reproduction based on the information (record time, record timing, frame rate) about the discriminated variable-frame-rate video component. Then, the ratio X of the reproducing time of the variable frame video component to the reproducing time of the entire recorded video image is calculated based on the result of the calculation. In the next step S902, the control unit 101 determines whether the ratio X calculated in the step S901 falls within a restriction range. It should be noted that the restriction range for the ratio X is set up beforehand, and is stored in the ROM 102, for example.

The control unit 101 proceeds with the process to step S903 when the ratio X does not fall within the restriction range (NO in the step S902), or proceeds with the process to step S904 when the ratio X falls within the restriction range (YES in the S902). In the step S903, the control unit 101 adjusts (expands or reduces) the width of the variable-frame-rate video section so as to fall within the restriction range, and calculates the ratio Y of the width of the adjusted variable-frame-rate video section to the entire length of the time sequence bar. In the step S904, the control unit 101 calculates the width of the variable-frame-rate video section on the time sequence bar according to the ratio X calculated in the step S901 or the ratio Y calculated in the step S903, and sends it to the image processing unit 106. The image processing unit 106 generates the display image (GUI) of the time sequence bar based on the received information, and displays it on the display screen 208.

As described above, this embodiment expands/reduces the width of the variable-frame-rate video section on the time sequence bar so as to fall within the predetermined range represented by the reproducing time in the variable-speed reproduction mode. Thereby, the user can visually identify the variable-frame-rate video section on the time sequence bar satisfactorily. Moreover, since the width of a variable-frame-rate video section is restricted with respect to the entire length of a time sequence bar to restrict the expansion/reduction process, a touch area that is required to keep minimum visibility and to allow a touch operation can be maintained.

[Display Form of Frame Rate Bar 410]

The frame rate bar 410 vertically displayed at the right side of the reproduction video 500 in the display screen 208 in FIG. 5 will be described. The frame rate bar 410 consists of three areas 505, 506, and 507 corresponding to three frame rates that can be selected at the time of taking video in this embodiment.

The area 505 is arranged on the middle row on the frame rate bar 410, and shows that the video component under reproduction was taken and recorded at the normal frame rate (60 FPS). The area 506 is arranged on the upper row on the frame rate bar 410, and shows that the video component under reproduction was taken and recorded at the high frame rate (360 FPS). The area 507 is arranged on the lower row on the frame rate bar 410, and shows that the video component under reproduction was taken and recorded at the low frame rate (30 FPS).

A frame rate pointer 508 that shows the frame rate at which the video component under reproduction was taken and recorded is indicated at the right side of the frame rate bar 410. The display position of the frame rate pointer 508 varies as the frame rate of the video component under reproduction changes. The user easily understands the frame rate of the video component that is currently reproduced in view of the display position of the frame rate pointer 508. For example, FIG. 5 shows the condition immediately after reproducing the reproduction video 500, and the reproduction position pointer 504 points the video component that was taken and recorded at the normal frame rate near the left edge of the time sequence bar 400. The single-speed reproduction at the normal frame rate is performed. At this time, the frame rate pointer 508 is displayed at the position that points the area 505.

Figure 10A:
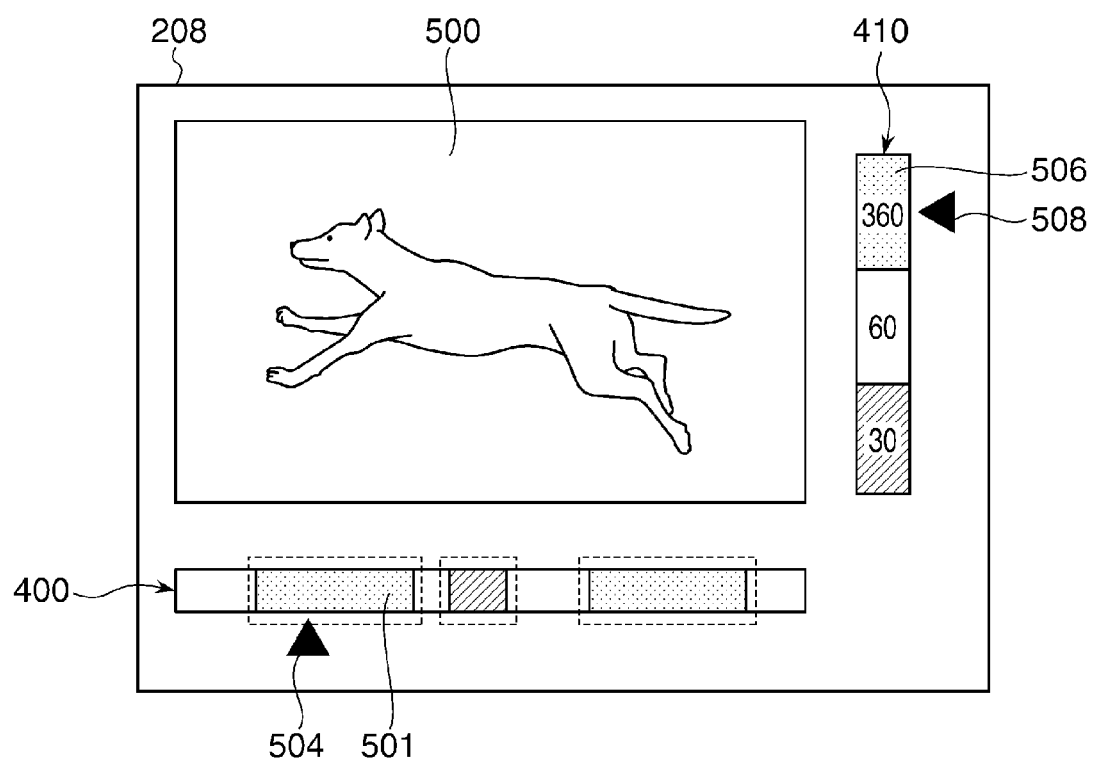
FIG. 10A and FIG. 10B are views showing a state where the reproducing position moves to a high-frame-rate video component, and a state where the reproducing position moves to a low-frame-rate video component, respectively, after the video reproduction proceeds from the state in FIG. 5.

FIG. 10A shows the state where the reproduction position moves to the high-frame-rate video component after the video reproduction progresses from the state in FIG. 5. The reproduction position pointer 504 points the high-frame-rate video section 501 on the time sequence bar 400. At this time, the frame rate pointer 504 is indicated at the position that points the area 506, which shows that the video component that is currently reproduced was taken and recorded at the high frame rate. It should be noted that the high-frame-rate video component is reproduced with the slow reproduction because the reproduction video 500 is reproduced at the normal frame rate.

Figure 10B:
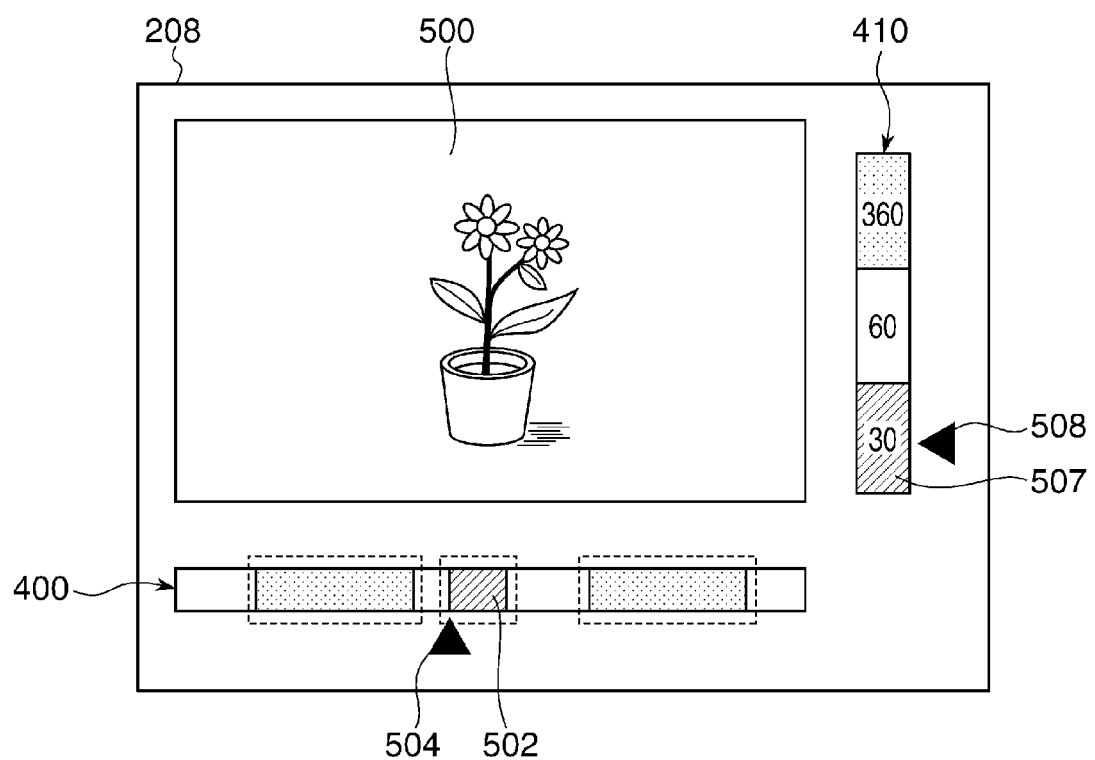

FIG. 10B shows the state where the reproduction position moves to the low-frame-rate video component after the video reproduction progresses from the state in FIG. 10A. The reproduction position pointer 504 points the low-frame-rate video section 502 on the time sequence bar 400. At this time, the frame rate pointer 504 is indicated at the position that points the area 507, which shows that the video component that is currently reproduced was taken and recorded at the low frame rate. It should be noted that the low-frame-rate video component is reproduced with the fast reproduction because the reproduction video 500 is reproduced at the normal frame rate.

Thus, in the digital video camera 100, when the frame rate at the time of taking video changes during reproduction of the recorded video, the frame rate pointer 508 on the frame rate bar 410 moves accordingly, and the frame rate of the video component under reproduction is shown to the user. Thereby, when the user reproduces and views the video image in which a normal frame rate video component and a variable-frame-rate video component are mixed, the user can understand the frame rate of the video component under reproduction easily at a glance.

[Direct Reproduction of Variable-Frame-Rate Video Component]

In the above-mentioned description, it is described that the user can directly reproduce the video component of the high-frame-rate video section 501 by touching the touch area 501a on the time sequence bar 400 displayed in FIG. 5. In relation to this, the following configuration may be employed. That is, when the user touches the specified frame rate shown on the frame rate bar 410, the video components taken by the same frame rate as the touched frame rate are selected automatically, and are reproduced continuously. For example, when the user touches the touch area 506a in FIG. 5, the video component of the high-frame-rate video section 501 will be reproduced, and the video component of the high-frame-rate video section 503 will be reproduced successively. The order of the video components reproduced in that case shall follow time series.

When such a reproducing method is employed, video components of a specific frame rate are directly and intelligibly reproduced in response to a user's need to preferentially watch the video components at the specific frame rate that were taken while changing the frame rate. It should be noted that this reproducing method may be also performed on the multiple indication screen shown in FIG. 4.

Although the embodiments of the invention have been described, the present invention is not limited the above-mentioned embodiments, the present invention includes various modifications as long as the concept of the invention is not deviated. The embodiments mentioned above show examples of the present invention, and it is possible to combine the embodiments suitably.

For example, in the above-mentioned embodiment, it was presupposed that the control unit 101 performs controls over the entire digital video camera 100 including the process of the flowchart shown in FIG. 9, etc. However, the present invention is not limited to such a configuration that a single hardware device controls the digital video camera 100. A plurality of hardware devices may share the process so as to control the entire digital video camera 100.

Moreover, although the reproduction mode was limited to the variable-speed reproduction mode in the above-mentioned embodiment, the single-speed reproduction mode may be employed. Specifically, the restriction of the display area in the step S902 shown in FIG. 9 and the expansion/reduction process for the display area in the step S903 are applied in the single-speed reproduction mode, and the expansion/reduction process is applied to the display of the variable-frame-rate video section in the single-speed reproduction mode. As a result of this, the good visibility and touching operability for the variable-frame-rate video section can be obtained in the single-speed reproduction mode, too.

Moreover, a configuration that changes to the suitable display form for the changed mode when the single-speed reproduction mode and the variable-speed reproduction mode are changed in the reproduction mode may be employed. Specifically, the time sequence bar on the taking time basis is displayed in the single-speed reproduction mode. On the other hand, the time sequence bar on the reproduction time basis is displayed with the time sequence bar on the taking time basis, or without displaying the time sequence bar on the taking time basis in the variable-speed reproduction mode. Thereby, it becomes easy for a user to grasp the time length reproduced. Moreover, one of the time sequence bar on the taking time basis and the time sequence bar on the reproduction time basis may be selected and displayed in response to a user's operation.

Furthermore, the present invention may employ a configuration that initially displays the time sequence bar on the taking time basis and switches the display to the time sequence bar on the reproduction time basis without changing the reproduction position of the video when the time sequence bar on the taking time basis is touched in the variable-speed reproduction mode. Then, when the displayed time sequence bar on the reproduction time basis is touched, the reproduction position of the video is changed in response to the touched position as mentioned above. Moreover, when there is no touch operation for a predetermined period under the condition where the time sequence bar on the reproduction time basis is displayed, the display automatically returns to the time sequence bar on the taking time basis. Thereby, the time sequence bar on the taking time basis is usually displayed, and it is changed to the time sequence bar on the reproduction time basis suitable for a touch operation when the user tries to touch the time sequence bar. Thus, the user's operability is improved.

Concerning the method for displaying the variable-frame-rate video section, the above-mentioned embodiment took up the method for expanding/reducing the display area about the time sequence bar on the reproduction time basis in the variable-speed reproduction mode. However, the present invention is not limited to this. For example, a fixed expansion rate or a fixed reduction rate may be defined for every frame rate included in the recorded video. This enables to simplify the expansion/reduction process for the variable-frame-rate video section. Moreover, the display width on the time sequence bar may be fixed for every frame rate included in the recorded video. When such a method is employed, and when the one scene of the recorded video includes many variable-frame-rate video components, for example, a user can easily check where the variable-frame-rate video components exist in the one scene.

Furthermore, the method for displaying the time sequence bar in the above-mentioned embodiment is effective even when recorded video images that are different in the frame rate at the time of taking video are continuously reproduced. Specifically, there shall be a recorded video image (file) taken at only the high frame rate and a recorded video image (file) taken at only the normal frame rate. When these recorded video files are selected and continuously reproduced in the variable-speed reproduction mode, the reproducing time in the normal reproduction mode of each video file is calculated, for example. The entire reproducing time of the time sequence bar is calculated by summing the reproducing time periods obtained. The video sections are clarified using the ratio of the reproducing time of each video file. Thereby, a user satisfactorily and visually identifies the range of a video file that is taken at only the variable-speed frame rate at the time of reducing the video file continuously in the same manner as the method for displaying the time sequence bar for the recorded video image including a variable-frame-rate video component and a normal-frame-rate video component. In this case, the video files reproduced continuously are equivalent to a "recorded video", and each video file is equivalent to a "video component".

In the above-mentioned embodiment, although the case where the present invention is applied to a digital video camera is described as an example, the present invention is not limited to this, but can be applied to any electric devices that can reproduce the video image that is taken at different frame rates at different reproduction speeds. For example, the present invention is applicable to a personal computer, a PDA, a cell phone, a portable image viewer, a digital photo frame, an electronic-book reader, a printer equipped with a display, a music player, a game machine, etc.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222203, filed on Oct. 4, 2012, which is hereby incorporated by reference herein in its entirety.

What is claimed is:

1. A video reproducing apparatus comprising:
a reproduction unit configured to reproduce a video image in which video components taken at different frame rates are mixed and to display the video image on a display unit; and
a display control unit configured to display a single sequence bar for the video image on the display unit,
wherein said display control unit controls the display of the sequence bar so that a ratio of the length of a second section to time required to take a second video component is larger than a ratio of the length of a first section to time required to take a first video component, when the video image includes the first video component taken at a first frame rate and the second video component taken at a second frame rate higher than the first frame rate, and when the first section indicating the first video component and the second section indicating the second video component are indicated on the sequence bar.

2. The video reproducing apparatus according to claim 1, wherein said display control unit controls the display of the sequence bar so that a ratio of the length of a third section to time required to take a third video component is smaller than the ratio of the length of the first section to time required to take the first video component, when the video image includes the third video component taken at a third frame rate lower than the first frame rate, and when the third section indicating the third video component is also indicated on the sequence bar.

3. A video reproducing apparatus comprising:
a display unit;
a reproduction unit configured to reproduce a video image in which video components taken at different frame rates are mixed and to display the video image on said display unit; and
a display control unit configured to display a single sequence bar for the video image on said display unit,
wherein said display control unit controls the display of the sequence bar so that a ratio of the length of a third section to time required to take a third video component is smaller than a ratio of the length of a first section to time required to take a first video component, when the video image includes the first video component taken at a first frame rate and the third video component taken at a third frame rate lower than the first frame rate, and when the first section indicating the first video component and the third section indicating the third video component are indicated on the sequence bar.

4. The video reproducing apparatus according to claim 3, wherein said display control unit controls the display of the sequence bar so that the third section is not shorter than a predetermined restriction width.

5. The video reproducing apparatus according to claim 4, wherein the restriction width is defined as a predetermined ratio with respect to the entire length of the sequence bar.

6. The video reproducing apparatus according to claim 1, wherein said display control unit displays the sections indicating the video components taken at the different frame rates on the sequence bar with lengths corresponding to the time lengths required to reproduce the video components at a specific frame rate.

7. The video reproducing apparatus according to claim 6, wherein said display control unit controls the display of the sequence bar so as to equalize ratios of the time lengths required to reproduce the video components at the specific frame rate to the respective lengths of the sections indicating the video components taken at the different frame rates.

8. A video reproducing apparatus comprising:
a reproduction unit configured to reproduce a video image in which video components taken at different frame rates are mixed at a specific frame rate and to display the video image on a display unit; and
a display control unit configured to display a single sequence bar for the video image on said display unit,
wherein said display control unit controls to display a first section indicating a first video component on the sequence bar with a length based on a time length required to reproduce the first video component at the specific frame rate and to display a second section indicating a second video component on the sequence bar with a length based on a time length required to reproduce the second video component at the specific frame rate, when the video image includes the first video component taken at a first frame rate and the second video component taken at a second frame rate higher than the first frame rate.

9. The video reproducing apparatus according to claim 1, wherein said display control unit displays the sequence bar beside the video image reproduced by said reproduction unit.

10. The video reproducing apparatus according to claim 1, further comprising a designation unit configured to allow a user to designate a position on the sequence bar,
wherein said reproduction unit reproduces the video component corresponding to the position on the sequence bar designated by the user through said designation unit.

11. The video reproducing apparatus according to claim 10, wherein said designation unit is a touch panel provided on said display unit.

12. The video reproducing apparatus according to claim 1, wherein said display control unit displays a separate sequence bar based on actual taking time lengths of the video components taken at the different frame rates on said display unit in place of the sequence bar or in company with the sequence bar.

13. The video reproducing apparatus according to claim 12, wherein said display control unit selects one of the sequence bar and the separate sequence bar according to a user's operation, and displays the selected sequence bar on said display unit.

14. The video reproducing apparatus according to claim 13, wherein said display control unit displays the sequence bar in place of the separate sequence bar on said display unit without changing a reproduction position, when the user operates the separate sequence bar.

15. The video reproducing apparatus according to claim 1, wherein said display control unit displays a single frame rate bar that indicates the different frame rates in company with the sequence bar.

16. The video reproducing apparatus according to claim 15, further comprising a designation unit configured to allow a user to designate a specific frame rate indicated on the frame rate bar,
wherein said reproduction unit continuously reproduces the video components that were recorded at the specific frame rate designated by said designation unit in the video image.

17. A display control method for a video reproducing apparatus that reproduces a video image in which video components taken at different frame rates are mixed and displays the video image on a display unit, the display control method comprising:
- a bar display step of displaying a single sequence bar for the video image on the display unit; and
- a control step of controlling the display of the sequence bar so that a ratio of the length of a second section to time required to take a second video component is larger than a ratio of the length of a first section to time required to take a first video component, when the video image includes the first video component taken at a first frame rate and the second video component taken at a second frame rate higher than the first frame rate, and when the first section indicating the first video component and the second section indicating the second video component are indicated on the sequence bar.

18. A display control method for a video reproducing apparatus that reproduces a video image in which video components taken at different frame rates are mixed and displays the video image on a display unit, the display control method comprising:
- a bar display step of displaying a single sequence bar for the video image on the display unit; and
- a control step of controlling the display of the sequence bar so that a ratio of the length of a third section to time required to take a third video component is smaller than a ratio of the length of a first section to time required to take a first video component, when the video image includes the first video component taken at a first frame rate and the third video component taken at a third frame rate slower than the first frame rate, and when the first section indicating the first video component and the third section indicating the third video component are indicated on the sequence bar.

19. A display control method for a video reproducing apparatus that reproduces a video image in which video components taken at different frame rates are mixed and displays the video image on a display unit at a specific frame rate, the display control method comprising:
- a bar display step of displaying a single sequence bar for the video image on the display unit; and
- a control step of controlling to display a first section indicating a first video component on the sequence bar with a length based on a time length required to reproduce the first video component at the specific frame rate and to display a second section indicating a second video component on the sequence bar with a length based on a time length required to reproduce the second video component at the specific frame rate, when the video image includes the first video component taken at a first frame rate and the second video component taken at a second frame rate higher than the first frame rate.

20. A non-transitory computer-readable storage medium storing a control program causing a computer to execute a display control method for a video reproducing apparatus that reproduces a video image in which video components taken at different frame rates are mixed and displays the video image on a display unit, the display control method comprising:
- a bar display step of displaying a single sequence bar for the video image on the display unit; and
- a control step of controlling the display of the sequence bar so that a ratio of the length of a second section to time required to take a second video component is larger than a ratio of the length of a first section to time required to take a first video component, when the video image includes the first video component taken at a first frame rate and the second video component taken at a second frame rate higher than the first frame rate, and when the first section indicating the first video component and the second section indicating the second video component are indicated on the sequence bar.

21. A non-transitory computer-readable storage medium storing a control program causing a computer to execute the display control method for a video reproducing apparatus that reproduces a video image in which video components taken at different frame rates are mixed and displays the video image on a display unit, the display control method comprising:
- a bar display step of displaying a single sequence bar for the video image on the display unit; and
- a control step of controlling the display of the sequence bar so that a ratio of the length of a third section to time required to take a third video component is smaller than a ratio of the length of a first section to time required to take a first video component, when the video image includes the first video component taken at a first frame rate and the third video component taken at a third frame rate slower than the first frame rate, and when the first section indicating the first video component and the third section indicating the third video component are indicated on the sequence bar.

22. A non-transitory computer-readable storage medium storing a control program causing a computer to execute the display control method for a video reproducing apparatus that reproduces a video image in which video components taken at different frame rates are mixed and displays the video image on a display unit at a specific frame rate, the display control method comprising:
- a bar display step of displaying a single sequence bar for the video image on the display unit; and
- a control step of controlling to display a first section indicating a first video component on the sequence bar with a length based on a time length required to reproduce the first video component at the specific frame rate and to display a second section indicating a second video component on the sequence bar with a length based on a time length required to reproduce the second video component at the specific frame rate, when the video image includes the first video component taken at a first frame rate and the second video component taken at a second frame rate higher than the first frame rate.

* * * * *